United States Patent Office 2,825,656
Patented Mar. 4, 1958

2,825,656

THERMOPLASTIC SHEETING, ETC.

Eric Eaton Walker, Michael Pearman Shaw, and Valentine Wilfred Frank Fisher, Spondon, near Derby, England, assignors to British Celanese Limited, a corporation of Great Britain No Drawing. Application July 23, 1954
Serial No. 445,486

Claims priority, application Great Britain July 27, 1953

16 Claims. (Cl. 106—177)

This invention relates to thermoplastic sheeting, etc., and has as its principal object to provide thermoplastic sheet material capable of standing long periods of outdoor exposure without becoming unserviceable.

Thermoplastic, non-fibrous sheeting having a basis of plasticized cellulose acetate shows considerable resistance to outdoor exposure, but after prolonged exposure, as in the case of most thermoplastic materials, the surface of the sheeting may become crazed. This crazing occurs more quickly if titanium dioxide (especially in the anatase form) is present in the sheeting. In other respects titanium dioxide is one of the most useful of white pigments, and we have therefore sought methods of stabilizing the cellulose acetate composition against the degrading effect of titanium dioxide in combination with sunlight. The mechanism of the acceleration of crazing produced by titanium dioxide is not understood, and we have not been able to devise a satisfactory laboratory ageing test to simulate in a shorter time the effect of prolonged outdoor exposure. It has therefore been necessary to carry out long-term trials to assess the value of various substances as stabilizers. Trials have been carried out with a large number of substances, some white and some coloured. It was thought that the crazing might be connected with the development of acidity by the plasticizer contained in the sheeting, and tests were therefore made on sheeting containing trichlorethyl phosphate, since this plasticizer more easily liberates acid than the more usual phthalate and phosphate plasticizers. The substances investigated as possible stabilizers included anti-acids, anti-oxidants and substances selected for their absorption of ultraviolet radiation. In all these classes, however, some substances gave an improved result, some were substantially without effect, and some actually accelerated the change it was desired to inhibit. Many of the substances investigated had to be discarded on account of discolouration occurring during the test.

In the trials referred to, particularly valuable results were obtained by the use of a mixture of a chromium compound (such as barium chromate) with a polycyclic nitrogenous compound (e. g. copper phthalocyanine or chlorinated copper phthalocyanine) which can be formulated as containing chelate rings in which a co-valently linked atom of a metallic element of valency greater than one is co-ordinated with a nitrogen atom that forms part of a system of conjugated double bonds. Thus, for example, sheeting made of cellulose acetate plasticized with trichlorethyl phosphate and containing titanium dioxide, barium chromate and copper phthalocyanine or chlorinated copper phthalocyanine was found to have a useful life, under continuous outdoor exposure, more than three times that of similar sheeting from which the chromate and the phthalocyanine were omitted. The stabilizing effect obtained is the more remarkable because both the chromium compound and the phthalocyanine, if employed separately in a similar sheet containing titanium dioxide actually accelerated the onset of crazing, and in addition, the chromium compound rapidly become discoloured.

The compositions of the invention comprise a thermoplastic material that suffers more degradation on exposure to the weather in the presence of titanium dioxide than in the absence thereof, said composition containing titanium dioxide and an agent that reduces the rate of such degradation, said agent comprising a chromium compound together with a polycyclic nitrogenous compound that can be formulated as containing chelate rings in which a covalently linked atom of a metallic element of valency greater than one is co-ordinated with a nitrogen atom that forms part of a system of conjugated double bonds. Preferably the chromium compound is a metallic chromate and the metal of the cyclic compound is one of atomic number 23 to 29, i. e. vanadium, chromium, manganese, iron, cobalt, nickel or copper.

The following examples, in which all the parts are by weight, illustrate the invention:

Example 1

By the block process, sheets 0.1" in thickness were made of the following composition:

100 parts of cellulose acetate of acetyl value (expressed as acetic acid) 51 to 53%;
40 parts of trichlorethyl phosphate;
0.06 part of titanium dioxide (anatase);
0.02 part of chlorinated copper phthalocyanine (sold as the pigment "Monastral Fast Green G");
0.08 part of barium chromate.

(In the block process, a dough-like mixture of the solid constituents which are to form the sheet, with about 30% of volatile solvent, is worked on hot malaxating rolls to reduce the solvent content to 10 to 15%, and sheeted into hides, which are then hot-pressed to form a block. From the block, sheets of the desired thickness are sliced and are then seasoned, straightened and polished.)

Two of such sheets were moistened with solvent and placed in a heated press, with a sheet of wire fabric between them. The wire fabric was of 12 meshes to the inch, and formed of 30-gauge galvanized iron wire. The assembly in the press was formed into a single wire-reinforced sheet.

The sheet material made according to the example was substantially non-inflammable, and samples of it after continuous outdoor exposure in London and Derby for one year showed substantially no deterioration in appearance. The material was very suitable for advertising signs and decorations. Similar results can be obtained when the cellulose acetate of the sheet material is of higher acetyl value than that specified above, e. g. 53 to 56%.

Even better stability can be obtained by using the rutile form of titanium dioxide, preferably containing small proportions of zinc oxide (0.25 to 1%) added to inhibit change to the anatase crystal form, of aluminium oxide (1.5 to 2%) and of silica (0.5 to 0.7%), both contributing to the stability.

Example 2

The procedure was as described in Example 1, except that instead of the anatase there was employed an equal weight of a commercial rutile titanium dioxide of the following approximate percentage composition by weight:

| | |
|---|---|
| $TiO_2$ (rutile form) | 97.0 |
| ZnO | 0.25 |
| $Al_2O_3$ | 1.5 |
| $SiO_2$ | 0.5 |
| $P_2O_5$ | 0.4 |
| $H_2O$ | 0.5 |

Examples 3 and 4

The procedure was as described in Examples 1 and 2 respectively, except that for chlorinated copper phthalocyanine there was substituted the corresponding unsubstituted compound.

When relative non-inflammability in the product is not important, other plasticizers can be used, e. g. dimethyl phthalate and diethyl phthalate (both preferably in conjunction with a minor proportion, e. g. 25% of their weight, of a stiffening plasticizer such as triphenyl phosphate), dibutyl phthalate, dibutyl tartarate, triacetin, triethyl citrate, acetyl triethyl citrate, methyl-phthalyl ethyl glycolate and ethyl-phthalyl ethyl glycolate.

Other inorganic chromium compounds that can be used instead of barium chromate include other metallic chromates, especially alkaline earth chromates such as those of calcium and strontium, magnesium chromate, aluminium chromate, heavy metal chromates such as those of zinc, cadmium, lead and manganese. Organic chromium compounds can also be employed, e. g. the chromium salts of organic acids such as acetic acid and other fatty acids and hydroxy acids such as lactic acid, tartaric acid and citric acid. Salts, and especially organic-acid salts, of other amphoteric metals, e. g. manganese, tungsten, vanadium and aluminium can also be present. The salt should preferably be water-insoluble, relatively stable in the sense of not readily undergoing oxidation, reduction or hydrolysis, and should be free from ionisable hydrogen.

The polycyclic nitrogen-containing compounds that can be used include, for example, metallic co-ordination compounds of bis-aceto-acetonyl ethylene diamine such as:

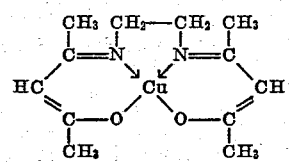

and similar tricyclic compounds; those of 2-hydroxy benzene-azo-methine-azo-2'-hydroxy benzene such as:

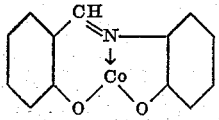

and similar compounds in which one or both o-phenylene groups are replaced by other o-aromatic bivalent groups, e. g. o-naphthylene groups or nuclear halogenated, alkylated or aralkylated o-phenylene or o-naphthylene groups; and metal complexes of aromatic azo compounds having —OH groups in both beta positions relative to an azo group as in 2-hydroxy benzene-azo-2'-hydroxy benzene, 2-hydroxy benzene-azo - 2'- hydroxy-3'-phenyl-5'-methyl-3'-4'-diazole:

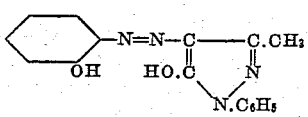

2-hydroxy-benzene-azo-2',4'-dihydroxy benzene, 2 - hydroxy-4-chlor-benzene-azo-2',4'-dihydroxy benzene and 2-hydroxy - 4 - chlor-benzene-azo-2'-hydroxy naphthalene. We may, for example, employ copper, nickel, chromium or other heavy metal complexes of any of these azo compounds or their substitution products, especially substitution products free from acidic groups. These metal complexes of azo compounds can be formulated as containing groups of the formula:

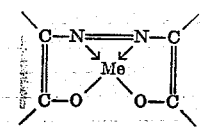

in which the carbon atoms (shown directly attached to the nitrogen atoms of the azo group or groups) form part of aromatic rings. It seems very probable that the effect of these compounds is bound up with the possibilities of resonance that their structures afford. Particularly good results have been obtained with compounds such as the phthalocyanines in which the metal is held partly by co-ordinate bonds and partly by dative bonds within a polycyclic structure which affords long trains of conjugated double bonds and so provides many possibilities of resonance. Thus, the preferred polycyclic compounds contain the group:

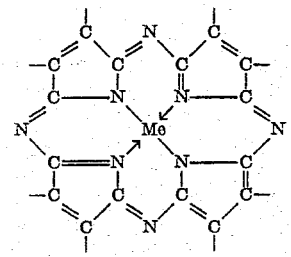

where Me is an atom of a metal of atomic number 23 to 29. Examples of compounds containing this group are: copper phthalocyanine, chlorinated copper phthalocyanine, nickel phthalocyanine, chromium phthalocyanine, manganese phthalocyanine, vanadium phthalocyanine, the tetraza-porphins and octa-phenyl tetraza-porphins of copper, manganese, chromium, nickel and cobalt. A similar polycyclic structure is the porphin grouping itself:

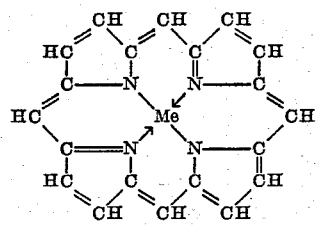

and the invention includes the use of compounds containing this grouping, where Me is a metal of valency greater than one and preferably a metal of atomic number 23 to 29.

The invention has been described in connection with the production of a wire-reinforced sheet. It will be understood, however, that the compositions of the invention are useful in making sheets which are not reinforced. Sheet materials may be made according to the invention by other methods than the block process, e. g. by casting methods and by extrusion. The invention also includes the provision of moulding and extrusion compositions containing plasticized cellulose acetate, titanium dioxide and the stabilizers of the invention, and the moulding and hot-extrusion of such compositions. The stabilizing effect on thermoplastic compositions containing titanium dioxide, and articles and materials made therefrom, is not confined to products containing cellulose acetate as the film-forming polymer. A similar effect is obtained in products of the general kinds referred to having a basis of other esters of cellulose, e. g. cellulose propionate, cellulose butyrate, cellulose acetate propionate and cellulose acetate butyrate. The thermoplastic composition may also be based upon a cellulose ether, e. g. ethyl cellulose or benzyl cellulose. Certain non-cellulosic thermoplastics, e. g. polyamides such as the nylons, polyesters such as polyethylene terephthalate, and polyurethanes, as well as some polyvinyl and polyvinylidene compounds, e. g. copolymers of vinyl chloride with vinyl acetate and of vinylidene chloride with vinyl chloride and with acrylonitrile, when formed into sheet materials containing titanium dioxide, are also liable to undergo crazing on outdoor exposure, especially when polymer or plasticizer can readily develop acidity, e. g. by dehydrochlorination or hydrolysis. The invention includes stabilizing such sheet materials by means of the stabilizers of the invention. The invention is of particular importance in stabilizing sheet materials containing titanium dioxide and a film-forming polymer when that polymer or any plasticizer present comprises an ester of a strong acid (i. e. an acid of dissociation constant above $10^{-3}$) or a substance containing chlorine and hydrogen attached to adjacent carbon atoms.

Having described our invention, what we desire to secure by Letters Patent is:

1. A solid composition containing a plasticized thermoplastic substitution derivative of cellulose, titanium dioxide and as stabilizer against the deteriorating effect of outdoor exposure a mixture of a water-insoluble metallic chromate and a polycyclic nitrogenous compound containing chelate rings in which a co-valently linked atom of a metallic element of valency greater than one is co-ordinated with a nitrogen atom that forms part of a system of conjugated double bonds.

2. A solid composition containing a thermoplastic substitution derivative of cellulose plasticized with an ester of an acid of dissociation constant at least $10^{-3}$, titanium dioxide and as stabilizer against the deteriorating effect of outdoor exposure a mixture of a water-insoluble metallic chromate and a polycyclic nitrogenous compound containing chelate rings in which a co-valently linked atom of a metallic element of valency greater than one is co-ordinated with a nitrogen atom that forms part of a system of conjugated double bonds.

3. A solid composition containing a plasticized thermoplastic substitution derivative of cellulose, titanium dioxide and as stabilizer against the deteriorating effect of outdoor exposure a mixture of a water-insoluble metallic chromate and a polycyclic nitrogenous compound containing chelate rings in which a co-valently linked atom of a metallic element is co-ordinated with a nitrogen atom that forms part of a system of conjugated double bonds, said metallic element being selected from the class consisting of vanadium, chromium, manganese, iron, cobalt, nickel, copper.

4. A solid composition containing a thermoplastic substitution derivative of cellulose plasticized with an ester of an acid of dissociation constant at least $10^{-3}$, titanium dioxide and as stabilizer against the deteriorating effect of outdoor exposure a mixture of a water-insoluble metallic chromate and a polycyclic nitrogenous compound containing chelate rings in which a co-valently linked atom of a metallic element is co-ordinated with a nitrogen atom that forms part of a system of conjugated double bonds, said metallic element being selected from the class consisting of vanadium, chromium, manganese, iron, cobalt, nickel, copper.

5. A solid composition containing a plasticized thermoplastic substitution derivative of cellulose, titanium dioxide and as stabilizer against the deteriorating effect of outdoor exposure a mixture of a water-insoluble metallic chromate and a phthalocyanine compound of a metal selected from the class consisting of vanadium, chromium, manganese, iron, cobalt, nickel, copper.

6. A solid composition containing a thermoplastic substitution derivative of cellulose plasticized with tri-(monochlorethyl)-phosphate, titanium dioxide and as stabilizer against the deteriorating effect of outdoor exposure a mixture of a water-insoluble metallic chromate and a phthalocyanine compound of a metal selected from the class consisting of vanadium, chromium, manganese, iron, cobalt, nickel, copper.

7. A solid composition containing a plasticized cellulose acetate, titanium dioxide and as stabilizer against the deteriorating effect of outdoor exposure a mixture of a water-insoluble metallic chromate and a polycyclic nitrogenous compound containing chelate rings in which a co-valently linked atom of a metallic element of valency greater than one is co-ordinated with a nitrogen atom that forms part of a system of conjugated double bonds.

8. A solid composition containing a cellulose acetate plasticized with an ester of an acid of dissociation constant at least $10^{-3}$, titanium dioxide and as stabilizer against the deteriorating effect of outdoor exposure a mixture of a water-insoluble metallic chromate and a polycyclic nitrogenous compound containing chelate rings in which a co-valently linked atom of a metallic element of valency greater than one is co-ordinated with a nitrogen atom that forms part of a system of conjugated double bonds.

9. A solid composition containing a plasticized cellulose acetate, titanium dioxide and as stabilizer against the deteriorating effect of outdoor exposure a mixture of a water-insoluble metallic chromate and a polycyclic nitrogenous compound containing chelate rings in which a co-valently linked atom of a metallic element is co-ordinated with a nitrogen atom that forms part of a system of conjugated double bonds, said metallic element being selected from the class consisting of vanadium, chromium, manganese, iron, cobalt, nickel, copper.

10. A solid composition containing a cellulose acetate plasticized with an ester of an acid of dissociation constant at least $10^{-3}$, titanium dioxide and as stabilizer against the deteriorating effect of outdoor exposure a mixture of a water-insoluble metallic chromate and a polycyclic nitrogenous compound containing chelate rings in which a co-valently linked atom of a metallic element is co-ordinated with a nitrogen atom that forms part of a system of conjugated double bonds, said metallic element being selected from the class consisting of vanadium, chromium, manganese, iron, cobalt, nickel, copper.

11. A solid composition containing a plasticized cellulose acetate, titanium dioxide and as stabilizer against the deteriorating effect of outdoor exposure a mixture of a water-insoluble metallic chromate and a phthalocyanine compound of a metal selected from the class consisting of vanadium, chromium, manganese, iron, cobalt, nickel, copper.

12. A solid composition containing a cellulose acetate plasticized with tri-(monochlorethyl)-phosphate, titanium dioxide and as stabilizer against the deteriorating effect of outdoor exposure a mixture of a water-insoluble metallic chromate and a phthalocyanine compound of a metal selected from the class consisting of vanadium, chromium, manganese, iron, cobalt, nickel, copper.

13. A solid composition containing plasticized cellulose acetate, titanium dioxide and as stabilizer against the deteriorating effect of outdoor exposure a mixture of barium chromate and copper phthalocyanine.

14. A solid composition containing plasticized cellulose acetate, titanium dioxide and as stabilizer against the deteriorating effect of outdoor exposure a mixture of barium chromate and chlorinated copper phthalocyanine.

15. A solid composition containing cellulose acetate plasticized with tri-(monochlorethyl)-phosphate, titanium dioxide and as stabilizer against the deteriorating effect of outdoor exposure a mixture of barium chromate and copper phthalocyanine.

16. A solid composition containing cellulose acetate plasticized with tri-(monochlorethyl)-phosphate, titanium dioxide and as stabilizer against the deteriorating effect of outdoor exposure a mixture of barium chromate and chlorinated copper phthalocyanine.

References Cited in the file of this patent

UNITED STATES PATENTS 2,086,714    Hucks _____ July 13, 1937

(Other references on following page)

UNITED STATES PATENTS

| | | |
|---|---|---|
| 2,170,658 | Hucks | Aug. 22, 1939 |
| 2,315,870 | Nadler | Apr. 6, 1943 |
| 2,330,251 | Taylor | Sept. 28, 1943 |
| 2,330,254 | Whitehead | Sept. 28, 1943 |
| 2,602,756 | Hucks | July 8, 1952 |
| 2,615,860 | Burgess | Oct. 28, 1952 |
| 2,739,139 | Gabler et al. | Mar. 20, 1956 |

FOREIGN PATENTS

| | | |
|---|---|---|
| 612,414 | France | Oct. 23, 1926 |
| 282,980 | Great Britain | Jan. 5, 1928 |
| 466,490 | Great Britain | May 25, 1937 |